Patented Mar. 15, 1949

2,464,770

UNITED STATES PATENT OFFICE 2,464,770

ALKAMINE ESTERS OF PYRROLE-3,4-DICARBOXYLIC ACIDS

Donald E. Sargent, Easton, Pa., assignor to American Cyanamid Company, New York, N. Y., a corporation of Maine No Drawing. Application November 13, 1946, Serial No. 709,408

5 Claims. (Cl. 260—313)

This invention relates to alkamine esters of 2,5-diarylpyrrole-3,4-dicarboxylic acids.

Esters of a number of pyrrole carboxylic acids have been prepared by known methods, but the alkamine esters have not been produceable by these methods. It is with these esters that the present invention is concerned and they may be represented by the following structural formula:

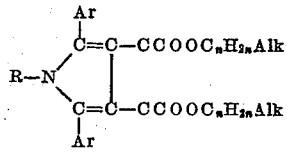

in which R is hydrogen or methyl, Ar is an aryl radical, and Alk is dialkylamino. The esters of the present invention are useful for a number of purposes such as activation of rubber accelerators and the like and some exhibiting local anaesthetic power.

Esters of the present invention may be prepared by catalyzed alcoholysis of the corresponding alkyl esters using an alkali metal alcoholate as the catalyst. The alkyl esters in general are prepared by the condensation of diaroylsuccinates with ammonia or primary amines.

The general reaction of diacylsuccinates with amines was discovered by Knorr in 1885 and is described in his article, Berichte, vol. 18, page 299 et seq. Throughout the specification this general reaction will be referred to as the Knorr reaction.

Almost any of the ordinary aryl radicals may be introduced by the use of the corresponding aroylsuccinates in the Knorr reaction in place of acetosuccinates, but I have found that the phenyl group produces the compounds of greatest practical importance and this is the preferred modification. However, homologous radicals such as tolyl and xylyl may be substituted or polynuclear radicals such as naphthyl may be introduced.

The alkamine esters of the present invention are obtainable in the form of the free bases or in the form of their salts, such as hydrochlorides. When used as local anaesthetics the latter form is preferred as it is in general more water soluble. The free bases, however, show greater effectiveness as activators for rubber accelerators.

The invention will be illustrated in greater detail in conjunction with the following specific examples which are typical illustrations. The parts are by weight and temperatures are uncorrected unless otherwise specified.

Example 1

β-diethylaminoethyl-1-methyl-2,5-diphenylpyrrole-3,4-dicarboxylate

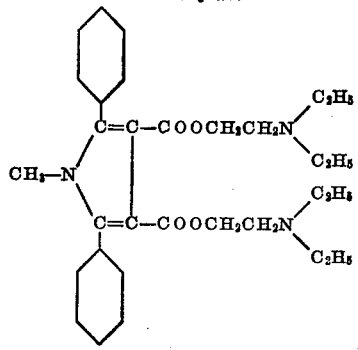

943 parts of ethyl-1-methyl-2,5-diphenylpyrrole-3,4-dicarboxylate (prepared, according to the Knorr reaction, by condensation of methylamine hydrochloride and diethyldibenzoylsuccinate, which in turn can be prepared from benzoyl acetic ester by reaction with sodium and iodine) are mixed with 1465 parts of β-diethylaminoethanol to which 10 parts of sodium have been added. The reaction mixture is heated up, ethyl alcohol distilling over at 78–80° C. When the temperature rises to the point where β-diethylaminoethanol begins to distill over the pressure is reduced and the remainder of the amino alcohol is distilled off under a partial vacuum.

A residue is obtained which is a viscous orange-yellow oil and is dissolved in ether, first washed with dilute sodium chloride solution and then with water. After drying the ether is removed under vacuum and a very viscous orange-yellow oil is obtained which is soluble in alcohol, acetone, ether and dilute acids, but is insoluble in water.

The crude ester forms salts with chlorplatinic acid and the hydrochloride may be prepared by treatment of the ester with dry hydrogen chloride in cold dry ether. The product is extremely hygroscopic and cannot be obtained in a sharply melting form.

When the above process is carried out using the dimethyldibenzoylsuccinate the same products are obtained.

Example 2

β-diethylaminopropyl-1-methyl-2,5-diphenylpyrrole-3,4-dicarboxylate

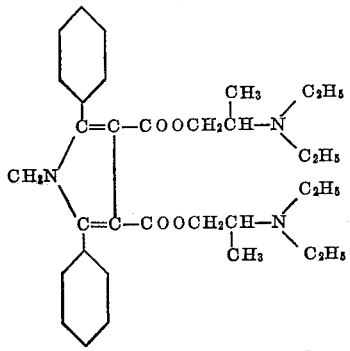

The procedure of Example 1 is followed but a corresponding amount of β-diethylaminopropanol is substituted for the β-diethylaminoethanol. The product obtained is an oil which has a very high boiling point and does not distill readily even under reduced pressure. A hydrochloride may be formed as in the case of the product of Example 1, but it is also very hygroscopic.

Example 3

β-dimethylaminoethyl-1-methyl-2,5-diphenylpyrrole-3,4-dicarboxylate

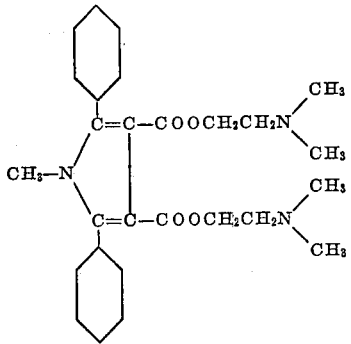

The procedure of Example 1 is followed substituting the corresponding amount of β-dimethylaminoethanol for the β-diethylaminoethanol. The product obtained is an oil which has a very high boiling point and which does not distill readly except under reduced pressure. The hydrochloride can be formed as in the case of the product of Example 1 and is extremely hygroscopic.

Example 4

γ-dipropylaminopropyl-1-methyl-2,5-diphenylpyrrole-3,4-dicarboxylate

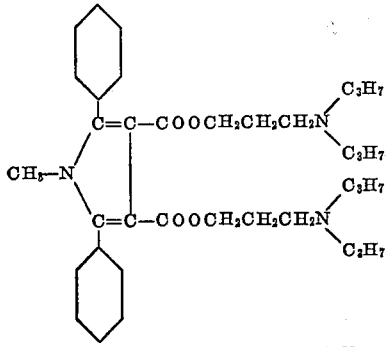

The procedure of Example 2 is followed but the corresponding amount of the γ-dipropylaminopropanol is substituted for the β-dimethylaminopropanol.

In the foregoing examples the catalyst sodium is added to the β-dialkylaminoalkanol where it, of course, reacts to produce the alcoholate. The addition of the sodium is in no sense critical. It may be added to the reaction mixture, or it may be reacted either with the amino alcohol or with ordinary ethyl alcohol to form an alcoholate and the ready formed alcoholate added to the reaction mixture. The relative insensitiveness of the reaction to the method of addition of the sodium alcoholate and the smoothness of the reaction is in marked contrast to the ordinary characteristics of amino alcohols and their esters, which usually are sensitive to oxidation in alkaline solution. No reason is advanced here why the present reaction proceeds readily in spite of this normal tendency to side reactions.

The amount of alkali metal alcoholate present is not critical, but it should be in catalytic amounts, that is to say amounts which are sufficient to vigorously catalyze the reaction but far below stoichiometric proportions. Good results are obtained with amounts of alcoholate of the order of $\frac{1}{10}$ mole per mole of the dicarbethoxypyrrole. This proportion is not critical and the term "catalytic amounts" will be used in the claims in its ordinary sense of small amounts far below stoichiometric proportions. Sodium can be replaced by potassium, but this presents no advantage in the reaction and, therefore, does not economically warrant the higher cost of potassium. For this economic reason the sodium alcoholate is preferred as the catalyst.

In many of the examples the dihydrochlorides of the products are described. These salts are most readily prepared and where the product is of utility as a local anaesthetic are preferred because they are readily soluble in water. The esters, however, are capable of reacting with other strong acids to produce the corresponding salts.

This application is in part a continuation of my copending application, Serial No. 496,961, filed July 31, 1943, now abandoned.

I claim:

1. Compounds selected from the group consisting of esters of dialkylamino alkanols and 1-methyl - 2,5 - diarylpyrrole-3,4-dicarboxylic acids having the following formula:

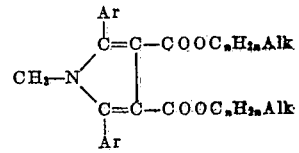

in which $n$ is a positive integer greater than zero and Ar is aryl and Alk is dialkylamino and acid addition salts of the esters.

2. Compounds according to claim 1 in which the aryl radicals are phenyl.

3. A member of the group consisting of β-diethylaminoethyl-1-methyl-2,5 - diphenylpyrrole-3,4-dicarboxylate having the formula:

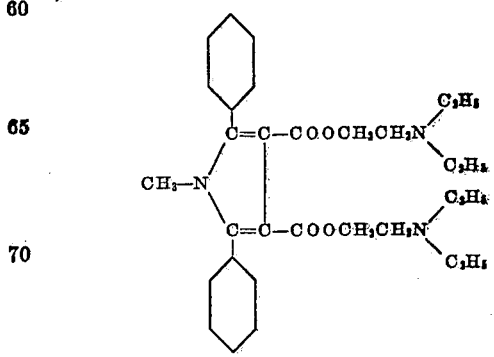

and its acid addition salts.

4. A method of preparing an alkamine ester of 1-methyl 2,5-diarylpyrrole-3,4-dicarboxylic acids having the formula:

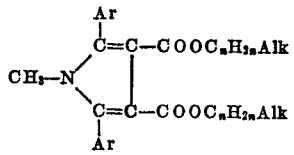

in which Ar is aryl and Alk is dialkylamino which comprises heating a diethyl ester of the same pyrrole 3,4-dicarboxylic acids with the desired dialkylamino alkanol in the presence of catalytic amounts of an alkali metal alcoholate.

5. A method of preparing alkamine esters of 1-methyl-2,5-diphenylpyrrole-3,4-dicarboxylic acid which comprises heating a diethyl ester of the dicarboxylic acid with the desired dialkylamino alkanol in the presence of catalytic amounts of alkali metal alcoholate.

DONALD E. SARGENT.

No references cited.